Figure 3:
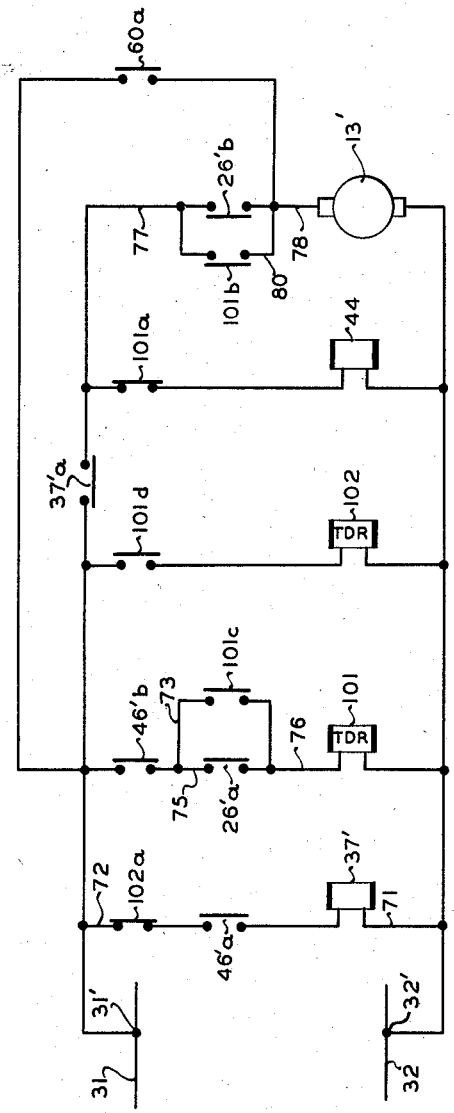

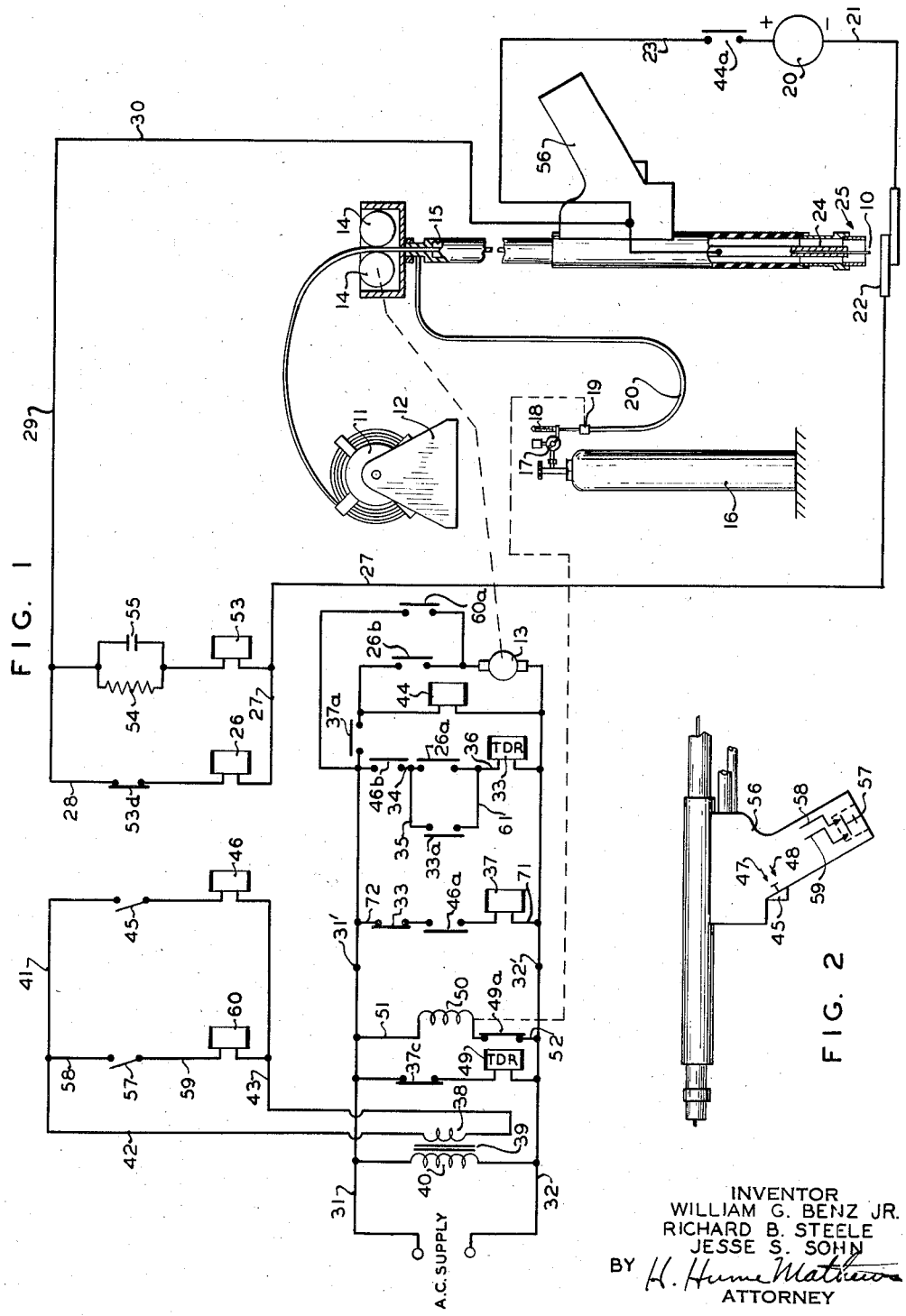

July 15, 1958  W. G. BENZ, JR., ET AL  2,843,727
METHOD AND APPARATUS FOR GAS SHIELDED LOCALIZED WELDING
Filed Nov. 15, 1954  2 Sheets-Sheet 2

INVENTOR
WILLIAM G. BENZ JR.
RICHARD B. STEELE
JESSE S. SOHN
BY
ATTORNEY

United States Patent Office 2,843,727
Patented July 15, 1958

2,843,727
METHOD AND APPARATUS FOR GAS SHIELDED LOCALIZED WELDING

William G. Benz, Jr., Rutherford, Jesse S. Sohn, Succasunna, and Richard B. Steele, New Providence, N. J., assignors to Air Reduction Company, Incorporated, New York, N. Y., a corporation of New York Application November 15, 1954, Serial No. 468,662

9 Claims. (Cl. 219—130)

This invention relates to a method of, and apparatus for, welding in a localized area. More particularly, this invention relates to methods of and apparatus for spot and stud welding characterized by the use of a gas shielded arc and a consumable electrode.

The term "localized welding," or its equivalents, as used herein is intended to refer to welding in a particular preselected region, as for example, spot or stud welding as accomplished in accordance with this invention.

Heretofore, a variety of welding methods had been employed to spot weld. In electric resistance spot welding techniques the metal pieces to be welded are inserted between two stationary electrodes and the heat required to produce the weld is obtained from the resistance of the work to the flow of electric current in a circuit of which the work is a part. The major disadvantage to resistance welding is that it requires accessibility to both sides of the work piece. Stick electrode methods of spot welding have likewise been unsatisfactory because of problems encountered in obtaining adequate penetration, i. e. inability of the heat to penetrate to the lower sheet to raise it to the required welding temperature without injuring the top sheet as by burning or by overmelting it. Gas shielded electric arc spot welding employing a non-consumable electrode constructed of refractory metal such as tungsten or molybdenum has also been employed. However, owing to the absence of filler metal and weld reinforcement, there is sometimes a depression or crater left behind which may weaken the weld by locally reducing the section thickness.

It is an object of this invention to provide a method of and apparatus for producing localized welds by gas shielded consumable electrode means in which such craters are not formed, with the consequent improvement in weld strength.

Still another object is to provide a method of gas shielded arc localized welding wherein the gas shield is maintained over the localized weld region for a period of time after the welding operation has terminated so that the porosity and brittleness of the weld is decreased.

It is a further object of this invention to provide a method of spot welding which is fast, has good penetration characteristics, permits welding from one side of the workpiece, and which deposits filler metal to reinforce and strengthen the weld.

A further object of this invention is to provide an improved method of and apparatus for stud welding.

It is still a further object to provide a semi-automatic means for gas shielded arc localized welding employing a consumable electrode.

Other objects will in part appear herein and in part be obvious from the following detailed description.

In a preferred embodiment of this invention, the consumable electrode is burned off at a very high rate, i. e., of at least 100 inches per minute for filler wires having a diameter of ⅛" to ⅟₃₂" and preferably from about 200 to about 360 inches per minute for spot welding and preferably about 110 to 150 inches per minute for stud welding, the rate depending, of course, upon the diameter and nature of the filler metal wire electrode and the thickness and character of the metal workpieces. High current densities are required to obtain this rate of electrode consumption.

While it is desirable and preferred practice to employ direct current reverse polarity (i. e. the workpiece serves as the cathode and the consumable wire electrode serves as the anode) for gas shielded localized welding in accordance with this invention, it has also been found that alternating current or direct current straight polarity can be employed if a certain substance or substances, herein termed "emissive addition agents," are supplied to the welding arc. In inert gas shielded metal arc welding of the common structural metals where the electrode is made the cathode and the work is made the anode (i. e., direct current straight polarity), considerably more heat is liberated in the wire than is liberated in the work, in some instances making the process inoperable. Supplying emissive agents to the welding arc enables the heat balance to be shifted to make the process operable by reducing the heat in the wire relative to the heat in the work. Normally, alternating current 60-cycle can not be used in inert gas shielded metal arc welding of common structural materials, since the arc would be extinguished at every half cycle necessitating the restriking of the arc. Supplying emissive agents to the welding arc will for the most part prevent the extinction of the arc when alternating current is employed as the source of welding current. Furthermore, the heat balance between the welding electrodes, i. e., the quantity of heat released or produced at the cathode during the welding operation relative to the heat released or produced at the anode during the welding operation, can be so modified by the addition of these "emissive agents" in gas shielded metal arc welding with direct current reverse polarity that less heat is liberated in the workpiece than is true without such additions, thereby decreasing heat penetration and preventing break through on thin sheets of metal. The addition of these emissive agents to the welding arc acts to improve the characteristics of the metal transfer from the consumable electrode to the workpiece and to improve the stability of the arc. The emissive agent is an element selected from the group consisting of the alkali metals, the alkaline-earth metals, lanthanum and the lanthanum series rare earth metals, actinium and the actinium series rare earth metals, scandium and yttrium. These elements can be added either in elemental or metallic form or in the form of compounds thereof which will either partially or wholly disassociate in the arc to liberate the said elements. For example, the oxides, carbonates, borates, phosphates, nitrates, silicates, or halides of said elements can be used and are particularly effective. The alkali metals are lithium, sodium, potassium, rubidium, cesium and francium. The alkaline-earth metals are calcium, barium, strontium and radium. Lanthanum series rare earths are cerium, praesodymium, neodymium, promethium, samarium, europium, gadolinium, terbium, dysprosium, holmium, erbium, thulium, ytterbium, luterium. Actinium series rare earth metals are thorium, protactinium, uranium, neptunium, plutonium, americum, and curium. These emissive agents can be supplied to the welding arc by applying trace amounts of the agents to the welding electrode. A more detailed description of the manner of use, application, and theory of operation of emissive agents in gas shielded arc welding with a consumable electrode, can be found in the copending applications of Albert Muller, Serial No. 288,447, now Patent No. 2,694,763, and Serial No. 288,448, now Patent No.

2,694,764, each filed on May 17, 1952, and assigned to the same assignee as is this invention.

The welding generator preferably is selected to supply a current having a drooping volt-ampere characteristic for the welding of ferrous metals, and for the welding of aluminum a constant potential generator is preferred. The electrode is preferably continuously fed through the gun to the arc at a rate approximately equal to the burn-off rate. This will insure an adequate deposit of filler metal and at the same time maintain the welding arc during the welding operation. The electrode is preferably in the form of a bare wire, however, it may be coated with a small amount of an emissive agent as described above. The welding tool or gun can be cooled by suitable means, for example, cooling water can be circulated around the welding tool in the manner shown and described in the copending application of George Turbett, S. N. 269,215, now Patent No. 2,727,970, filed January 31, 1952.

It has also been found that it is highly desirable to maintain the gas shield around the area to be welded for a period of time after the actual welding operation has terminated, i. e., after the electrode feed has stopped and the arc has been extinguished; and this inert gas shield is preferably maintained until after the weld metal has solidified. In this manner, the porosity and brittleness of the weld is held at a minimum. This is especially important in localized area welding according to the method of the present invention. The shielding gas employed may be an inert monatomic gas such as argon, helium, and the like, or a polyatomic gas such as carbon dioxide, or mixtures thereof. It is preferred to add small amounts of oxygen, i. e., from ½ to 5 percent by volume, to the monatomic gas such as argon, to improve the welding of ferrous metals such as steel. The inert monatomic gases are preferred for the welding of aluminum and other non-ferrous metals, whereas carbon dioxide can be employed with satisfactory results in the welding of ferrous metals such as mild steel and the like. Of the monatomic gases, argon is preferred since its naturally colder arc would inhibit burn-through on thin plates; in addition, a quieter and less turbulent arc is obtained when argon is used as the shielding gas. It is extremely desirable that the gas be supplied in such a manner as to form a substantially non-turbulent envelope of gas shielding the arc. This is accomplished, generally, by feeding the gas in such a manner that it flows axially in the general direction of the wire electrode with substantially no circumferential velocity.

The invention may be more fully understood by reference to the accompanying drawings which illustrate preferred embodiments for the semi-automatic performance of the method of this invention. In this drawing:

Fig. 1 is a schematic diagram of a welding apparatus suitable in practicing this invention as applied to spot welding;

Fig. 2 is a diagrammatic representation of a form of welding tool or hand gun suitable for the purposes of this invention. A more detailed description of such a welding gun may be found in U. S. Patent No. 2,659,796 to Nelson E. Anderson, which has been assigned to the same assignee of this invention.

Fig. 3 is a schematic diagram of a modification of the welding apparatus and circuit as illustrated by Fig. 1, to adapt the apparatus for use in stud welding as practiced by the present invention. The portion of the circuit shown in Fig. 3 is to be connected to lines 31 and 32 at points 31' and 32' as a substitute for that portion of the control circuit appearing to the right of points 31' and 32' in Fig. 1.

In accordance with the instant invention, spot welds are made by first assembling the parts to be joined and securing them in the proper position, establishing a non-tubulent gas envelope around a preselected spot region, forming an arc within said gas envelope between the preselected spot on the workpiece and a consumable wire electrode, burning off and depositing filler metal from said electrode, and extinguishing the arc, all of this being done while maintaining the welding tool in substantially fixed relationship to the workpiece.

Referring to Fig. 1, 10 indicates the wire electrode which is withdrawn from a reel 11 supported by a bracket 12, the wire being fed by a pair of feed rolls driven by motor 13. The feed rolls 14 serve to feed the wire electrode through a cable or a conduit 15 of fixed length interconnecting the wire feed mechanism with the welding head. A gas cylinder 16 serves to supply the shielding gas for shielding the arc, the gas line including a pressure reducing valve 17, a flow meter 18, a solenoid operated valve 19, and a tube 20 leading from the valve 19 to the conduit 15. The gas flows through the conduit 15 in a space between the shell of the conduit and the wire electrode 10 which is fed through the conduit by the feed rolls 14.

A welding generator or other suitable source of welding current 20 is connected by conductor 21 to the metal workpiece 22, the other pole or generator is connected through conductor 23 to the current pickup shoe 24 in the welding head 25, and shoe 24 makes electrical contact with the end of the wire electrode 10. A line switch 44a, is shown connected in series with the conductor 23. The source of welding current 20 is preferably a direct current welding generator, and the negative terminal of the generator is connected to the workpiece and the positive terminal to the wire electrode, thus providing what is characterized as reverse polarity for the welding arc.

In the apparatus illustrated in the accompanying drawings, the connection of the source of welding current with the wire electrode and with the workpiece, the feeding of the wire electrode, and the supply of welding gas are controlled by several relays and switch contacts. The apparatus includes a relay 26 having its operating coil connected across the electrode and the workpiece so as to be directly responsive to voltage between these elements. Thus, the relay 26 is connected to the workpiece 22 by a wire 27 and it is connected to the electrode through switch contacts 53a and wires 28, 29 and 30. The relay 26 is operable when energized to close the contacts 26a in a circuit represented by wires 31 and 32 connected to a suitable power source such as an ordinary 110 volt source of alternating current.

In Fig. 1 the wire feed motor 13 is connected in the circuit represented by wires 31 and 32, the motor being in series with contacts 26b of control relay 26, and also in series with contact 37a of a control relay 37. Time delay relay 33 in series with contacts 26a of control relay 26 and contacts 46b of control relay 46 is connected to supply lines 31 and 32. Contacts 33a of time delay relay 33 shunts contacts 26a, and is connected to line 34 through wire 35 and to line 36 through wire 61. Contacts 33a are adapted to close when time delay relay 33 times out to keep time delay relay energized and thus prevent recycling until the operator releases the trigger 45. Time delay relay 33 is adapted to be set for a period of time, usually 1–6 seconds, sufficient to complete the spot welding operation, and after the preselected time has expired the feed motor will discontinue to operate since the time delay contacts 33b are opened. Time delay relay contacts 33b, are responsive to time delay relay 33, in series with contacts 46a of control relay 46 and in series with control relay 37 is connected across lines 31 and 32 through wire 71 and 72, so that when time delay relay 33 times out, time delay relay contacts 33b are opened, deenergizing the coil of control relay 37 and thus opening control relay contacts 37a. This in turn de-energizes power relay 44 opening power relay contacts 44a and stopping the flow of current to the wire electrode 10, thereby halting the welding operation.

The manually operating switch contacts 45 in series with control relay 46 are connected, through wires 41, 42 and 43, across a suitable source of reduced voltage, such as the secondary winding 38 of the transformer 39 having the primary winding 40 connected across the supply leads 31 and 32. The manually operable switch contacts 45 are preferably mounted in the handle of the welding gun as best illustrated in Fig. 2, these contacts constituting a pressure switch biased to its open position except when pressure is applied thereto by hand to maintain the contacts closed.

The control circuit illustrated in Fig. 1 of the accompanying drawings also includes a power relay 44 for actuating the line switch contacts 44a in the welding circuit. The operating coil of a power relay 44 is connected across the power circuit wires 31 and 32 so that this relay is energized as soon as contacts 37a are closed in response to the operation of the relay 37 controlled by the hand-switch 45. Control relay contacts 37c of control relay 37 in series with time delay relay 49 is connected to supply lines 31 and 32. Gas operating solenoid 50 in series with time delay relay contacts 49a of time delay relay 49 is likewise connected to supply lines 31 and 32 through wires 51 and 52. Time delay relay 49 is adapted to maintain the flow of gas for a preselected time after the arc has been extinguished and the electrode feed terminated thus maintaining a protective gas shield around the newly formed weld until the weld metal has solidified. This is accomplished in the following manner: upon connecting wires 31 and 32 to the source of alternating current, current is supplied to time delay relay 49 through normally closed contacts 37c and to gas solenoid 50 through normally closed contacts 49a thereby producing an initial purge of inert gas through the gas nozzle; when time delay relay 49 times out, time delay relay contacts 49a are opened and the supply of current to gas solenoid 50 is interrupted thereby stopping the flow of gas; when pressure switch 45 is closed, control 46 is energized closing contacts 46a and energizing the operating coil of control relay 37 which opens control relay contacts 37c thereby de-energizing time delay relay 49 and permitting time delay relay contacts 49a to return to the closed position; the circuit to gas solenoid 50 is thus completed and the shielding gas flow is started; when time delay relay 33 times out, time delay relay contacts 33b are opened de-energizing the operating coil of control relay 37 and permitting contacts 37c to return to the closed position, whereupon time delay relay 49 starts timing and when it times out, contacts 49a are opened interrupting the flow of current to gas solenoid 50 and thereby terminating the flow of shielding gas.

The control circuit also includes what may be characterized as a lockout relay 53 connected to wire 29 through a parallel circuit comprising a resistance 54 and a condenser 55 and also connected to the workpiece 22 through wire 27. The relay 53 is thus responsive to voltage between the wire electrode and the workpiece, and this relay is of such a nature that it is effectively energized only when the voltage between the wire electrode and the workpiece is at open circuit voltage of the welding generator. Relay 53 controls contacts 53a in series with the operating coil of relay 26.

With the apparatus connected, and arranged as described above, it will be understood that when the operator grasps the handle 56 of the welding head 25, the trigger 45 is operated to close its contacts, thereby energizing control relay 46 closing control relay contacts 46a. Current is thus supplied to control relay 37, energizing it which closes contacts 37a in the auxiliary power circuit represented by the wires 31 and 32. The operating coil of the power relay 44 is thus supplied with current to cause this relay to close the line contacts 44a in the welding circuit whereby the voltage of the welding current source is impressed across the electrode 10 and the metal workpiece 22 through leads 21, switch contacts 44a and lead 23. Also, upon the energization of control relay 37, contacts 37c are opened, de-energizing time delay relay 49 and permitting time delay relay contacts 49a to return to the closed position supplying current to the operating solenoid 50 of the solenoid valve 19 in the gas supply line whereby inert gas flows from the tank 16 to and through the conduit 15 and into the welding head from which it emerges to form a protective shield of gas excluding air from the region between the end of the electrode and the preselected spot on the workpiece.

As soon as the welding potential is impressed across the welding electrode and the workpiece, the full potential of the welding source is available to energize the lockout relay 53 which immediately opens its contacts 53a and prevents relay 26 from being energized as long as this open circuit condition obtains in the welding circuit. The operator then moves the handgun until the electrode 10 touches the workpiece and then withdraws the same to strike an arc between the welding electrode 10 and the workpiece. When the wire electrode touches the workpiece, the lockout relay 53 is short-circuited, thus permitting contacts 53a to close and thereby connect the control relay 26 across the electrode and the workpiece. As soon as the arc is drawn and normal welding voltage exists between the electrode and the workpiece, the control relay 26 is energized to close its contacts 26a and its contacts 26b in the control circuit. Upon the closing of contacts 26a current is supplied to time delay relay 33 which thereupon starts its timing cycle. The circuit to the electrode feed motor 13 is completed by the closing of contacts 26b. The feed motor then starts and continues to operate at a constant rate of speed to feed the electrode wire 10 toward the arc. This condition obtains until time delay relay 33 times out.

After the preselected welding time has passed and time delay relay 33 times out its contacts 33b, normally closed, are opened thus de-energizing control relay 37 and opening control relay contact 37a. The flow of current to the feed motor 13 is thereby interrupted stopping the feeding of electrode wire 10 to the arc. Simultaneously, the opening of contacts 37a also stops the flow of current to power relay 44 de-energizing it and opening contactor 44a disconnecting the source of welding current. Also upon the deenergization of control relay 37, contacts 37c return to the closed position and time delay relay 49 starts timing. When time delay relay 49 times out, preferably after the weld metal has solidified, time delay relay contacts 49a are opened interrupting the flow of current to solenoid 50 and thereby discontinuing the supply of gas. Thus, since time delay relay 49 is adapted to start timing after time delay relay 33 times out and the arc has been extinguished and the electrode feed stopped, the gas shield is maintained for a preselceted time set on time delay relay 49. The gas shield can thus be continued until the weld metal has solidified.

The operator releases the trigger 45, all the controls return to their normal starting position, and the operator is ready to repeat the operation at the next selected spot.

It is also desirable to provide a jog switch 57 on the handle of the handgun, this jog switch being connected in series with the operating coil of relay 60 and contacts 60a in an auxiliary circuit, short-circuiting the switch contacts 37a, and 26b. Thus, when the jog switch 57 is closed, the relay 60 is energized through wires 43, 59, 58 and 42 to supply current to the wire feed motor 13 through contacts 60a regardless of whether the wire electrode and the workpiece are connected in closed circuit with the source of welding current. This jog switch accordingly serves as a means of feeding the electrode wire into the welding head 25 when the welding circuit is open, such feeding of the wire being useful in adjusting the point of the wire electrode preliminary to initiating the welding operation.

The resistance 54 and the capacitor 55 connected to the operating coil of the lockout relay 53 insure quick action of this relay so that it will be de-energized rapidly under the short-circuit condition obtaining when the electrode is touched to the metal workpiece, preliminary to striking the arc. This insures prompt reclosing of the contacts 53a controlling the supply of current to the control relay 26.

It will be understood that the apparatus described above illustrates a semi-automatic means for carrying out a method of spot welding employing a consumable electrode and an inert gas shield. The invention is not limited to the specific illustrative embodiment shown. Other means can be employed, for example, a consumable electrode can be used without continuous feed, permitting the electrode to burn back until a predetermined arc length is reached so that the arc can not be supported by the voltage generated by the welding generator, which may be a constant potential generator, and the arc is consequently extinguished, a protective gas shield being used to protect the weld. However, the semi-automatic method of spot welding as fully described above has many distinct advantages. The welding time for spot welding is normally very short, in the order of 1 to 6 seconds; and the provision of an automatic means for terminating the welding operation, tends to make the success of the weld independent of the reflex action and coordination of the operator. Provision is also made for automatically maintaining a gas shield around the region of the weld after the arc has been extinguished and until the weld metal has solidified. As stated hereinbefore, this additional inert gas shielding will tend to lessen the porosity and the brittleness of the weld; and this is especially important in spot welding.

Examples of conditions and welding settings satisfactorily employed and the results obtained in spot-plug welding hot rolled steel plates in accordance with the method of the present invention are illustrated by the following table. In all of the weld tests, the welding position was flat, the shielding (argon) gas flow was at the rate of 40 cu. ft. per hr.; and the electrode was $\frac{1}{16}$ inch manganese steel filler wire.

TABLE 1

*Spot-plug welding*

| Plate Thickness (inches) | Welding Current (amps.) | Wire Feed Speed (inches per min.) | Welding Time (secs.) | Penetration | Tensile Strength (p. s. i.) |
| --- | --- | --- | --- | --- | --- |
| 0.063 | 295 | 200 | 3.5 | No breakthru. | 690 |
| 0.063 | 295 | 200 | 3.5 | ___do___ | 1,000 |
| 0.1255 | 350 | 280 | 3.5 | ___do___ | 3,020 |
| 0.1255 | 350 | 320 | 3.5 | ___do___ | 2,585 |
| 0.1255 | 350 | 360 | 3.5 | ___do___ | 2,100 |

Fig. 3 illustrates a modification of the welding apparatus and circuitry shown in Fig. 2 which permits the equipment to be used for stud welding. According to this modification of the invention, the welding tool or gun is positioned over a localized region of the metal workpiece at an area where a stud weld is desired; an essentially non-turbulent gas is discharged from the welding tool to provide a shield or envelope surrounding the preselected localized region; an arc is established between the localized region of the metal workpiece and a consumable metal wire electrode; the said electrode is burned off and filler metal is deposited at the rate of at least 100 inches per minute; said electrode is fed toward the localized region at a rate substantially equivalent to the burn-off rates of the wire electrode so that the arc length is maintained substantially constant; the arc is extinguished after a preselected and predetermined time, usually about a fraction of a second and preferably in the order of between $\frac{20}{100}$ and $\frac{50}{100}$ of one second; the electrode feed is continued for a predetermined and preselected time, usually a fraction of a second, after the arc has been extinguished and for a period of time sufficient to drive the electrode into the molten weld metal; the electrode feed is discontinued after said predetermined and preselected time; the envelope of shielding gas is maintained about the localized region at least until the weld metal has solidified. The electrode is then cut off at the desired length leaving a stud securely welded at the preselected localized region.

This modification of the invention will be more fully understood by referring to Fig. 3. The circuit shown in Fig. 3 is to be read in conjunction with Fig. 1 in which that portion of the auxiliary circuit represented by lines 31 and 32 to the right of point 31' and 32' is replaced by the circuit of Fig. 3. In all other respects the welding apparatus and circuitry shown in Fig. 1 applies to the modifications shown in Fig. 3.

In the "stud welding" modification of Fig. 3, control relay 37' in series with contacts 46'a of control relay 46 and contacts 102a of time delay relay 102 is connected to supply lines 31 and 32 through wires 71 and 72. Time delay relay 101 in series with contacts 26'a of control relay 26 also in series with contacts 46'b of control relay 46 is likewise connected to supply lines 31 and 32. Contacts 101c of time delay relay 101 shunts contacts 26'a and is connected to line 75 through wire 73 and connected to line 76 through wire 74. Time delay relay 101 is designated to automatically control the duration of the arc. It will start timing after the arc has been struck and will time out at a predetermined and preselected time, usually in about a fraction of a second to about one second. The time being selected so that the metal workpiece is adequately melted at the preselected localized region at which the stud is to be welded. When time delay relay 101 times out contacts 101a are opened de-energizing the coil of power relay 44' opening welding contacts 44a and interrupting the flow of current in the welding circuit, thereby extinguishing the arc.

Time delay relay 102 in series with contacts 101d of time delay relay 101 is connected to supply lines 31 and 32. Time delay relay 102 will start its timing cycle when time delay relay 101 times out and contacts 101d are closed completing the circuit to time delay relay 102. Time delay relay 102 is adapted to maintain the circuit to the electrode feed motor 13 closed and continuing the electrode feed after the welding current has ceased to flow. The electrode will continue to feed for a period of time sufficient to enable the electrode to pass into the molten weld puddle. This usually will only take a fraction of a second. When time delay relay 102 times out, contacts 102a are opened de-energizing control relay 37' and opening contacts 37'a, interrupting the flow of current to the electrode feed motor, thereby stopping further feed of the electrode into the weld puddle.

The electrode feed motor 13' in series with contacts 26'b of control relay 26 is connected to supply lines 31 and 32. Contacts 101b of time delay relay 101 shunts contacts 26'b and is connected to lines 77 and 78 by wires 79 and 80, respectively. In this manner, the circuit to the electrode feed motor is not completed until the welding circuit is closed, the arc is struck, and control relay 26 is energized closing contacts 26'b. And, the circuit to the electrode feed motor is not broken until contacts 37'a are opened when control relay 37' is de-energized, since when time delay relay 101 times out, contacts 101b are closed completing the auxiliary circuit to the feed motor, although contacts 26'b are opened by the de-energization of control relay 26. In this manner the electrode feed is continued after the arc has been extinguished.

With the apparatus, connected and arranged according to the modification of Fig. 3, it will be readily understood that when the operator pulls the trigger or pressure switch 45 to close its contacts, control relay 46 is energized closing control relay contacts 46'a and 46'b. Current is supplied to control relay 37', energizing it which closes its contacts 37'a. The operating coil of power relay 44' is thus supplied with current to cause this relay to close the line contacts 44a in the welding circuit whereby the voltage of the welding current is impressed across the electrode 10 and the metal workpiece 22. Also, upon the energization of control relay 37', contacts 37'c are opened de-energizing time delay relay 49 and permitting time delay relay contacts 49a to return to the closed position, supplying current to gas solenoid 50 of the solenoid valve 19 in the gas supply line whereby shielding gas flows from the tank 16 to and through the conduit 15 and into the welding head from which it emerges to form a protective shield of gas excluding air from the region between the end of the electrode and the preselected spot on the workpiece.

As soon as the welding potential is impressed across the welding electrode and the workpiece, the full potential of the welding source is available to energize the lockout relay 53 which immediately opens its contacts 53a and prevents relay 26 from being energized as long as this open circuit condition obtains in the welding circuit. The operator then moves the handgun until the electrode 10 touches the workpiece and then withdraws the same to strike an arc between the welding electrode 10 and the workpiece. When the wire electrode touches the workpiece, the lockout relay 53 is short-circuited, thus permitting contacts 53a to close and thereby connecting the control relay 26 across the electrode and the workpiece. As soon as the arc is drawn and normal welding voltage exists between the electrode and the workpiece, the control relay 26 is energized to close its contacts 26'a and 26'b in the control circuit. Upon the closing of contacts 26'a current is supplied to time delay relay 101, which thereupon starts its timing cycle.

After the preselected welding time has passed and time delay relay 101 times out, its contacts 101a are opened de-energizing power relay 44 opening its contacts 44a in the welding circuit, thereby stopping the welding current and extinguishing the welding arc. Simultaneously contacts 101b of time delay relay 101 are closed thus keeping the circuit to the feed motor 13 completed. Thus, the electrode continues to feed into the molten weld puddle. At the same time, contacts 101d of time delay relay are closed completing the circuit to time delay relay 102 which starts its timing cycle. After the preselected additional electrode feed time has passed (i. e., a fraction to two seconds), time delay relay 102 times out opening its contacts 102a deenergizing control relay 37', its contacts 37'a are opened interrupting the flow of current to the feed motor and stopping the electrode feed. Simultaneously, contacts 37'c are permitted to return to their normally closed position by the de-energization of control relay 37' and time delay relay 49 starts to time in. When time delay relay 49 times out, preferably after the weld metal has solidified, its contacts 49a are opened interrupting the flow of current to gas solenoid 50 and thereby discontinuing the supply of gas.

The operator then releases the trigger 45, and all the controls return to their normal starting positions. The operator then cuts or clips the electrode leaving a stud of any desired length securely welded to the workpiece at the preselected spot. The operator is then ready to repeat the operation at the next selected spot.

The method of stud welding as described herein finds a variety of applications, for example, it could be used to put ground terminals on steel and zinc plates, steel chassis, using copper electrode wire, or ground terminals may be put on aluminum chassis using copper, silver or tin plated aluminum electrode wires.

Examples of conditions and welding settings satisfactorily employed and the results obtained in stud welding in accordance with the method of the present invention are illustrated by the following table. In each of the examples given below, the flow of shielding gas, argon, was at the rate of 40 cubic feet per hour, and the electrode wire feed speed was at the rate of 130 inches per minute.

TABLE II

*Stud welding*

| Plate Material | Plate Thickness (inches) | Electrode Filler Wire | | Welding Current (amps.) | Welding Time (sec.) | Penetration |
| --- | --- | --- | --- | --- | --- | --- |
| | | Thickness, inches | Material | | | |
| Hot Rolled Steel | .042 | 1/16 | Cu | 110 | 23/100 | Good—No Breaks. |
| Do | .042 | 1/16 | Cu | 110 | 23/100 | Do. |
| Do | .042 | 1/16 | Cu | 120 | 24/100 | Do. |
| Do | .042 | 1/16 | Cu | 120 | 28/100 | Do. |
| Zinc Plated Steel | .042 | 1/16 | Cu | 110 | 22/100 | Do. |
| Aluminum | .090 | 1/16 | Al | 110 | 37/100 | Do. |
| Do | .090 | 1/16 | Al | 110 | 45/100 | Do. |
| Do | .090 | 1/16 | Al | 110 | 61/100 | Do. |

It will be realized that the welding settings given in Tables I and II, above, need not be considered optimum settings for all operations. Certain techniques and practices peculiar to certain jobs will require their own modification.

What is claimed is:

1. The method of gas shielded arc stud welding which comprises situating a gas nozzle in operative relation to a preselected localized region on the workpiece to be welded, discharging a substantially non-turbulent shielding gas envelope from said nozzle to exclude air from said localized region, establishing an arc within said envelope between the localized region and a consumable wire electrode, burning off and depositing filler metal from said electrode, feeding the electrode at a rate substantially equivalent to the burn-off rate of said wire to maintain the arc length substantially constant, extinguishing said arc, continuing the feed of said electrode for a predetermined time after the arc has been extinguished and sufficient to drive said electrode into the molten weld metal, interrupting the electrode feed, maintaining said gas envelope about the molten weld metal until said weld metal has solidified, and cutting off said electrode at a desired length, all of the aforesaid being done while maintaining said gas nozzle in substantially fixed relationship to said workpiece.

2. Apparatus for gas shielded arc welding with a wire consumable electrode in a localized area, comprising means for supplying a gaseous medium to shield the arc between the electrode and the workpiece, means for supplying current to the electrode and the workpiece sufficient to consume said electrode at the rate of at least 100 inches per minute, means for feeding the wire electrode toward the arc and workpiece at the rate of at least 100 inches per minute, relay means operable when energized to actuate the electrode feeding means, time delay relay means operable to interrupt the welding current after a predetermined and preselected time, time delay relay means operable to deactivate the electrode feeding means after a predetermined and preselected time, and time delay relay means operable to interrupt the flow of shielding gas after a predetermined and preselected time after the welding current has been interrupted and said electrode feeding means has been deactivated.

3. Apparatus for gas shielded arc stud welding with a wire consumable electrode, comprising means for supplying a gaseous medium to shield the arc between the electrode and the workpiece, means for supplying current to the electrode and the workpiece sufficient to consume said electrode at the rate of at least 100 inches per minute, means for feeding the wire electrode toward the arc and the workpiece at the rate of at least 100 inches per minute, relay means operable when energized to actuate the electrode feeding means, time delay relay means operable to interrupt the welding current after a predetermined and preselected time, time delay relay means to deactivate the electrode feeding means after the welding current has been interrupted and after a predetermined and preselected time, and time delay relay means operable to interrupt the flow of shielding gas after a predetermined and preselected time after the welding current has been interrupted and said electrode feeding means has been deactivated.

4. A method of gas shielded arc welding a localized area of a workpiece which comprises locating a gas nozzle in a fixed operative position with respect to said localized area of the workpiece, discharging a flowing stream of shielding gas from said nozzle to substantially completely exclude ambient air from a region including said localized area of the workpiece, establishing a welding arc between a consuming wire electrode and said localized area of the workpiece, the arc end of said wire electrode, said arc, and said localized area of the workpiece all being within the region from which the air is excluded by said shielding gas stream, feeding said wire electrode toward said arc at a rate to maintain said arc as metal is transferred across said arc from said electrode to said localized area of the workpiece, interrupting the arc current a predetermined time after the initiation of said arc, interrupting the electrode feed a predetermined time after the initiation of said arc and interrupting the flow of arc shielding gas a predetermined time after the interruption of said arc current and not before the interruption of said electrode feed.

5. A method of gas shielded arc welding of a localized area of a workpiece which comprises locating a gas nozzle in a fixed operative position with respect to said localized area of the workpiece, discharging a flowing stream of shielding gas from said nozzle to substantially completely exclude the ambient air from a region including said localized area of the workpiece, establishing a welding arc between a consuming wire electrode and said localized area of the workpiece, the arc end of said wire electrode, said arc, and said localized area of the workpiece all being within the region from which the air is excluded by said shielding gas stream, feeding said wire electrode toward said arc at a rate to maintain said arc as metal is transferred across said arc from said electrode to said localized area of the workpiece, initiating the time cycle of a time delay device in response to the change in electrical conditions occasioned by the initiation of the welding arc, interrupting the arc current at the expiration of the time cycle of said time delay device, interrupting the electrode feed a predetermined time after the initiation of said arc and not before the interruption of said arc current, and interrupting the flow of arc shielding gas a predetermined time after the interruption of said arc current and not before the interruption of said electrode feed.

6. Apparatus for gas shielded electric arc welding of a localized area of a workpiece which comprises means for locating a gas nozzle in a fixed operative position with respect to a localized area of a workpiece to be welded, a source of shielding gas, means for delivering a flowing stream of such shielding gas from said source to said nozzle whereby a flowing stream of such shielding gas issues from said nozzle to substantially completely exclude ambient air from a region including said localized area of the workpiece, a consumable wire electrode, a source of welding current to supply a welding arc between said electrode and said localized area of the workpiece, means for advancing said electrode toward said arc at a rate to maintain said arc as metal is transferred across said arc from said electrode to said localized area of the workpiece, the arc end of said electrode, the arc, and the localized area of said workpiece all being within the region enveloped by said flowing stream of shielding gas, time delay means to automatically interrupt the arc current a predetermined time after the initiation of said welding arc, time delay means to automatically interrupt the electrode feed a predetermined time after the initiation of said welding arc, and time delay means to automatically interrupt the flow of arc shielding gas a predetermined time after the interruption of said arc.

7. Apparatus for gas shielded electric arc welding according to claim 6 in which the means to automatically interrupt the electrode feed acts to interrupt the electrode feed a predetermined time after the initiation of said welding arc and not before the interruption of said welding arc.

8. Apparatus for gas shielded electric arc welding according to claim 6 in which the means to automatically interrupt the electrode feed and the means to automatically interrupt the arc current act to interrupt the electrode feed and arc current substantially simultaneously.

9. Apparatus for gas shielded electric arc welding according to claim 6 in which the means to automatically interrupt the electrode feed acts to interrupt the electrode feed a predetermined time after the interruption of said welding arc and a predetermined time before the interruption of the flow of arc shielding gas.

References Cited in the file of this patent

UNITED STATES PATENTS

| | | |
|---|---|---|
| 1,278,983 | Morton | Sept. 17, 1918 |
| 1,884,712 | Jerabek | Oct. 25, 1932 |
| 2,504,868 | Muller et al. | Apr. 18, 1950 |
| 2,510,207 | Behnke et al. | June 6, 1950 |
| 2,510,415 | Pitcher | June 6, 1950 |
| 2,583,665 | Pilia | Jan. 29, 1952 |
| 2,694,763 | Muller | Nov. 16, 1954 |
| 2,694,764 | Muller | Nov. 16, 1954 |
| 2,776,361 | Essig | Jan. 1, 1957 |